(12) United States Patent
Randall

(10) Patent No.: US 7,661,378 B2
(45) Date of Patent: Feb. 16, 2010

(54) WASTEWATER BALLAST SYSTEM AND METHOD

(75) Inventor: Peter Randall, Miami, FL (US)

(73) Assignee: NCL Corporation Ltd., Miami, FL (US)

( * ) Notice: Subject to any disclaimer, the term of this patent is extended or adjusted under 35 U.S.C. 154(b) by 0 days.

(21) Appl. No.: 12/276,723

(22) Filed: Nov. 24, 2008

(65) Prior Publication Data

US 2009/0071389 A1  Mar. 19, 2009

Related U.S. Application Data

(63) Continuation of application No. 11/519,975, filed on Sep. 13, 2006, now Pat. No. 7,455,022, which is a continuation of application No. 11/347,273, filed on Feb. 6, 2006, now Pat. No. 7,128,009, which is a continuation of application No. 10/760,487, filed on Jan. 21, 2004, now Pat. No. 7,059,261.

(51) Int. Cl.
B63B 39/03 (2006.01)

(52) U.S. Cl. .................. 114/125; 210/614

(58) Field of Classification Search .......... 114/121, 114/125; 210/614, 620
See application file for complete search history.

(56) References Cited

U.S. PATENT DOCUMENTS

| 2,963,245 | A | 12/1960 | Bolton |
| 4,071,445 | A | 1/1978 | Katayama et al. |
| 4,197,200 | A | 4/1980 | Alig |
| 4,228,788 | A | 10/1980 | Moeser |
| 4,846,976 | A | 7/1989 | Ford |
| 4,886,607 | A | 12/1989 | Lalonde et al. |
| 5,192,451 | A | 3/1993 | Gill |
| 5,208,461 | A | 5/1993 | Tipton |
| 5,254,253 | A | 10/1993 | Behmann |
| 5,374,356 | A | 12/1994 | Miller et al. |
| 5,785,865 | A | 7/1998 | Salis |
| 5,816,181 | A | 10/1998 | Sherman, Jr. |
| 5,932,091 | A | 8/1999 | Tompkins et al. |
| 5,932,112 | A | 8/1999 | Browning, Jr. |
| 6,125,778 | A | 10/2000 | Rodden |
| 6,207,047 | B1 | 3/2001 | Gothreaux |
| 6,361,695 | B1 | 3/2002 | Husain et al. |
| 6,402,945 | B1 | 6/2002 | Swales et al. |
| 6,516,738 | B2 | 2/2003 | Cannon |
| 6,613,232 | B2 | 9/2003 | Chesner et al. |
| 6,616,833 | B2 | 9/2003 | Lynch |
| 6,638,420 | B2 | 10/2003 | Tyllila |
| 6,672,233 | B2 | 1/2004 | Wippermann |
| 6,773,611 | B2 | 8/2004 | Perlich et al. |
| 2002/0066399 | A1 | 6/2002 | Cannon |
| 2002/0153324 | A1 | 10/2002 | Lynch |
| 2002/0174814 | A1 | 11/2002 | Hunter |
| 2002/0175128 | A1 | 11/2002 | Swales et al. |
| 2003/0015481 | A1 | 1/2003 | Eidem |
| 2003/0121464 | A1 | 7/2003 | O'Reilly et al. |
| 2004/0026336 | A1 | 2/2004 | Yuri et al. |
| 2004/0099608 | A1 | 5/2004 | Leffler et al. |
| 2007/0006787 | A1 | 1/2007 | Randall |

Primary Examiner—Lars A Olson
(74) Attorney, Agent, or Firm—Sheppard, Mullin, Richter & Hampton LLP

(57) ABSTRACT

The invention discloses a wastewater ballast method that includes the steps of collecting wastewater, treating the collected wastewater, storing the treated wastewater, and discharging the treated wastewater during ballast operations.

19 Claims, 6 Drawing Sheets

WASTEWATER BALLAST SYSTEM AND METHOD

The present application is a Continuation and claims the benefit, under 35 U.S.C. §120, of U.S. patent application Ser. No. 11/519,975, filed on Sep. 13, 2006 now U.S. Pat. No. 7,455,022, which is a Continuation of U.S. Patent application Ser. No. 11/347,273, filed on Feb. 6, 2006, now U.S. Pat. No. 7,128,009, which is a Continuation of U.S. patent application Ser. No. 10/760,487, filed on Jan. 21, 2004, now U.S. Pat. No. 7,059,261, which is expressly incorporated fully herein by reference.

BACKGROUND OF THE INVENTION

1. Technical Field

This invention relates to the field of ballasting. More particularly, this invention relates to the field of wastewater ballasting.

2. Discussion

Vessels typically take on fuel, food, and water in-port in preparation for seagoing operations. During seagoing operations, the fuel, food, and water are consumed aboard the vessel. The consumption of fuel during seagoing operations requires the in-take of ballast to maintain the stability of the vessel. In addition, the consumption of food and water results in the generation of wastewater, e.g., graywater, blackwater, galley water, that must be stored aboard the vessel. The wastewater must be treated and disinfected before it can be discharged to the sea, or the wastewater must be discharged in-port at dedicated disposal facilities that are able to receive such toxic effluent. When the vessels return to port, the vessels take on additional fuel, food, and water in preparation for further seagoing operations. The in-take of additional fuel, food, and water during in-port operations requires the vessel to perform de-ballast operations to maintain the stability of the vessel.

In such known systems, vessels discharge seawater ballast from ballast tanks during in-port refueling and de-ballast operations. In such known ballast systems and methods, vessels intake and store seawater as ballast during seagoing operations. The vessels discharge this seawater ballast during in-port ballast operations to maintain the stability of the vessel as additional fuel, food, and water is loaded onto the vessel. The intake of seawater ballast from one region of the world and the subsequent discharge of that seawater ballast in another region of the world may contaminate marine sanctuaries, ecosystems, and other biologically-sensitive areas, particularly local or regional waters that surround port locations. This contamination occurs when the seawater ballast is discharged directly into local or regional waters, thereby introducing non-indigenous marine life and similar foreign pathogens and marine organisms that are present in the seawater ballast into local or regional waters.

To reduce such contamination, known systems may treat the seawater ballast with biocides and other toxins prior to discharge of the seawater ballast in local or regional waters. This treatment is designed to kill and remove the marine organisms that are contained in the seawater, so that such organisms do not contaminate local or regional waters during vessel ballast operations that utilize seawater ballast. In such known systems that rely on seawater to ballast the vessel, vessels must store untreated wastewater aboard the vessel in holding tanks and then pump the untreated wastewater ashore during in-port operations to disposal facilities that are qualified to receive such toxic effluent. Alternatively, they may discharge such effluent at sea, or if approved for Alaska, in port.

SUMMARY OF THE INVENTION

The present invention provides a novel ballast system and method. More particularly, the present invention provides a novel wastewater ballast system and method.

In one embodiment of the invention, a wastewater ballast method comprises the steps of collecting wastewater, treating the collected wastewater, storing the treated wastewater as ballast, and discharging the treated wastewater during de-ballast operations.

In another embodiment of the invention, a wastewater ballast system comprises a wastewater treatment system for receiving and treating wastewater, a wastewater ballast tank for storing the treated wastewater as ballast, and a ballast discharge system for discharging the treated wastewater from the wastewater ballast tank.

In a further embodiment of the invention, a contingency wastewater ballast method comprises the steps of treating wastewater, storing the treated wastewater, testing the treated wastewater, exchanging ballast water at sea by taking in local seawater as ballast upon entry into regional waters, discharging the treated wastewater during ballast operations if the treated wastewater meets testing thresholds, and discharging the regional seawater ballast during in-port ballast operations if the treated wastewater does not meet testing thresholds.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF PREFERRED EMBODIMENTS

The present invention relates to a ballast system and method. More particularly, the present invention relates to a wastewater ballast system and method that treats wastewater that is generated during vessel operations, stores the treated wastewater on-board die vessel, and then discharges the treated wastewater from the vessel during vessel ballast operations.

The present invention further includes a contingency ballast method and system that ballast a vessel when the treated wastewater does not meet predetermined thresholds for discharge in local or regional waters.

Figure 1:
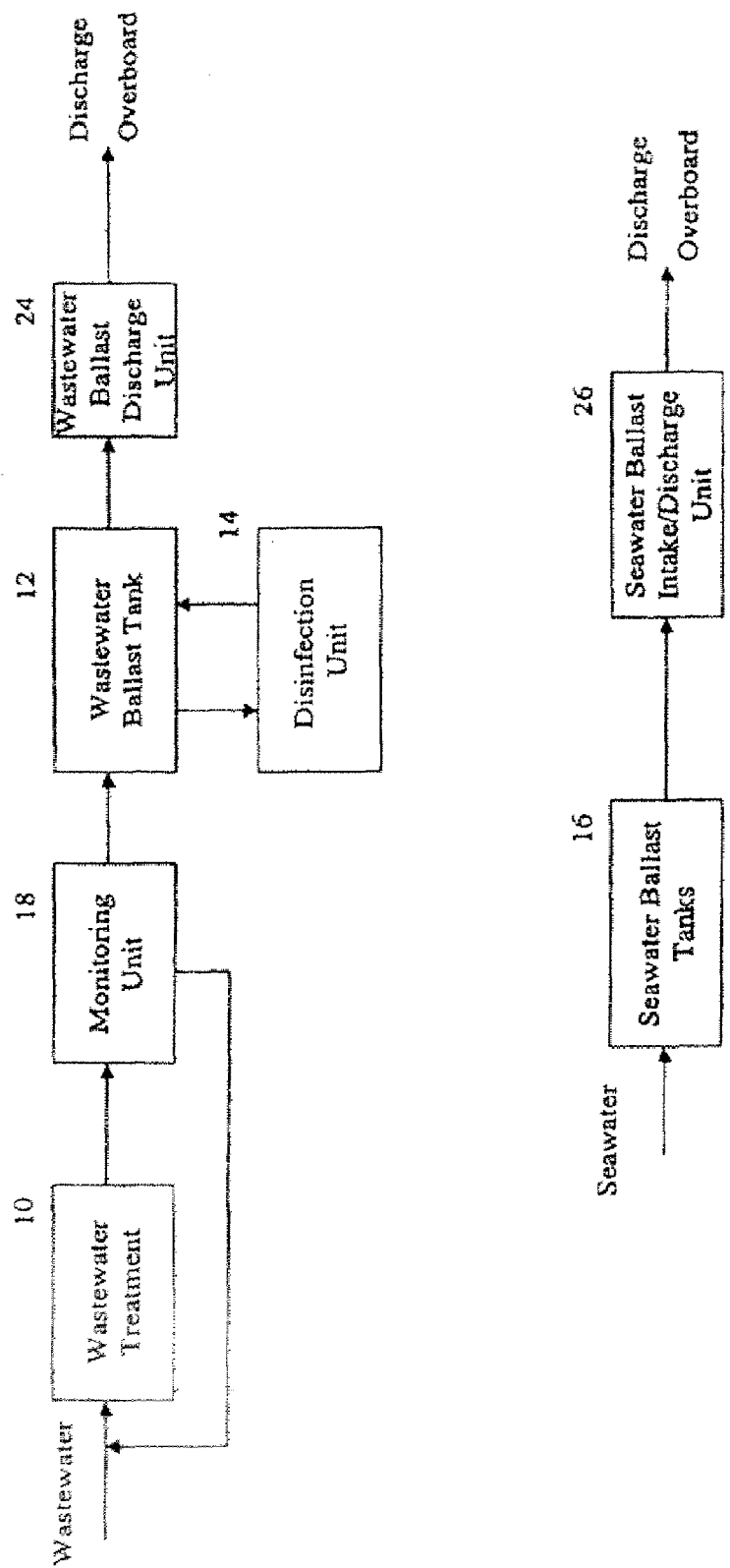
FIG. 1 illustrates a ballast system according to the invention.

As shown in FIG. 1, a wastewater ballast system according to one embodiment of the present invention comprises a wastewater treatment system 10, a wastewater ballast tank 12, a disinfection unit 14, a monitoring unit 18, and a wastewater ballast discharge unit 24.

The wastewater treatment system 10 includes an advanced wastewater treatment system e.g., the Scanship Wastewater Treatment System, that treats wastewater that is generated aboard a vessel. The wastewater may include galley water, graywater, blackwater, and similar effluent that is generated during the operation of a vessel. The wastewater may be generated by passengers and crew during the normal operation of the vessel. The wastewater also may be generated by operations of the vessel, e.g., vessel maintenance, galley operations, in one embodiment of the invention, the wastewater treatment system 10 progressively filters and treats the wastewater, so that the treated wastewater meets federal, state, and local environmental, health, and similar regulatory requirements for discharge in local or regional waters during vessel ballast operations. The wastewater treatment system 10 filters and treats the wastewater to remove sludge and particulate matter, and to change the chemical contaminants of the wastewater, in one embodiment of the invention, the wastewater treatment system 10 may filter the wastewater by passing the wastewater through one or more filtering units or treatment units, e.g. a bio-reactor, a fine filtering unit (not shown). The wastewater treatment system 10 then further decontaminates the filtered wastewater by dosing the filtered wastewater with electromagnetic radiation, e.g., ultraviolet light, to kill fecal coliforms, bacteria, and other pathogens and microorganisms.

The wastewater ballast tank 12 may include a converted wastewater holding tank, e.g., a tank that has been cleaned, coated, disinfected, and connected to a vessel ballast discharge system, or similar receptacles that are capable of receiving and storing the treated wastewater. In another embodiment of the invention, the wastewater ballast tank 12 may be a seawater ballast tank that is converted and retrofitted to receive and store the treated wastewater. The wastewater ballast tank 12 may include a single tank or multiple tanks.

To control the growth of residual bacteria in the wastewater that is stored in the wastewater ballast tank 12, the treated wastewater may be re-circulated from the wastewater ballast tank 12 through the disinfection unit 14. The disinfection unit 14 kills any residual bacteria and other pathogens that may be present in the wastewater ballast tank 12, or the treated wastewater, or both. The disinfection unit 14 may include an ultraviolet (UV) disinfection unit that decontaminates the treated wastewater by dosing it with ultraviolet light or similar electromagnetic radiation when the treated wastewater is circulated from the wastewater ballast tank 12 through the disinfection unit 14. The disinfection unit 14 may also use a non-chemical disinfectant, e.g., ozone or hydroxyl ion injection. The wastewater ballast tank 12 may include a pump (not shown) to circulate the stored, treated wastewater from the ballast tank 12 to the disinfection unit 14 and back to the wastewater ballast tank 12 after the wastewater has been disinfected in the disinfection unit 14.

In another embodiment of the invention, the treated wastewater may be recirculated from the wastewater ballast tank 12 through the wastewater treatment system 10, or a portion of the wastewater treatment system 10, e.g., a UV treatment unit of the wastewater treatment system 10, so that the treated wastewater may be retreated to remove particulate and sludge and kill fecal conforms, bacteria, and other pathogens that are present in the treated wastewater.

The wastewater ballast system also includes a monitoring unit 18. After the wastewater is treated in the wastewater treatment system 10, the treated wastewater is circulated through the monitoring unit 18. In one embodiment of the invention, the monitoring unit 18 may include a turbidity monitor that measures the turbidity of the treated wastewater. In this embodiment of the invention, if the turbidity of the treated wastewater exceeds predetermined thresholds, the treated wastewater may be recirculated through the wastewater treatment system 10. Thus, the monitoring unit 18 ensures that the treated wastewater meets required threshold standards before the treated wastewater is stored in the wastewater ballast tank 12, so that the treated wastewater may be discharged directly into local or regional waters, during ballast operations, e.g., in-port ballast operations, without further treatment or processing. Upon re-circulation of the wastewater through the wastewater treatment system 10, the wastewater again circulates through the monitoring unit 18. If the re-circulated wastewater meets the testing threshold requirements, e.g., statutory or regulatory standards, the wastewater is pumped to she wastewater ballast tank 12. If the re-circulated wastewater does not meet the testing threshold requirements, the re-circulated wastewater is again re-circulated through the wastewater treatment system 10. This process may be repeated, as necessary, until the monitoring unit 18 determines that the wastewater meets or exceeds threshold values or standards.

The wastewater ballast discharge unit 24 operates to discharge the treated wastewater that is stored in the wastewater ballast tank 12 from the vessel. The wastewater ballast discharge unit 24 may discharge treated wastewater during vessel ballast operations, e.g. during in-port de-ballast operations of a vessel. In another embodiment of the invention, the wastewater ballast discharge unit 24 may pump treated wastewater from the wastewater ballast tank 12 ashore to a disposal facility (not shown) when the treated wastewater ballast does not meet predetermined threshold requirements to enable its discharge into local or regional waters. In this embodiment of the invention, the wastewater ballast system contingency system performs vessel ballast operations, as discussed in more detail below.

The wastewater ballast system also may include one or more seawater ballast tanks 16 and a seawater ballast intake/discharge unit 26. The seawater ballast intake/discharge unit 26 intakes seawater and stores the seawater as ballast in the seawater ballast tanks 16. The seawater ballast intake/discharge unit 26 also discharges the seawater ballast from the seawater ballast tanks 16 during ballast operations of the vessel. In one embodiment of the invention, the seawater intake/discharge unit 26 and the seawater ballast tanks 16 operate as a contingency ballast system, as described in more detail below, to ballast a vessel when the wastewater ballast system is unable to do so. In this embodiment of the invention, die seawater intake/discharge unit 26 intakes seawater as ballast in the seawater ballast tanks 16 during seagoing operations, e.g., when the vessel is operating in non-local waters. When the vessel enters regional or local waters, the seawater intake/discharge unit 26 exchanges the non-local seawater ballast in the seawater ballast tanks 16 for local or regional seawater ballast. The seawater intake/discharge unit 26 discharges non-local, deep ocean seawater ballast from the seawater ballast tanks 16 upon first call in local or regional wasters and intakes local or regional seawater, which the seawater intake/discharge unit 26 stores in the seawater ballast tanks 16. When the vessel docks to perform in-port de-ballast operations, the seawater intake/discharge unit 26 may discharge the focal or regional seawater ballast from the seawater ballast tanks 16 directly into local or regional waters to stabilize the ship.

Figure 2:
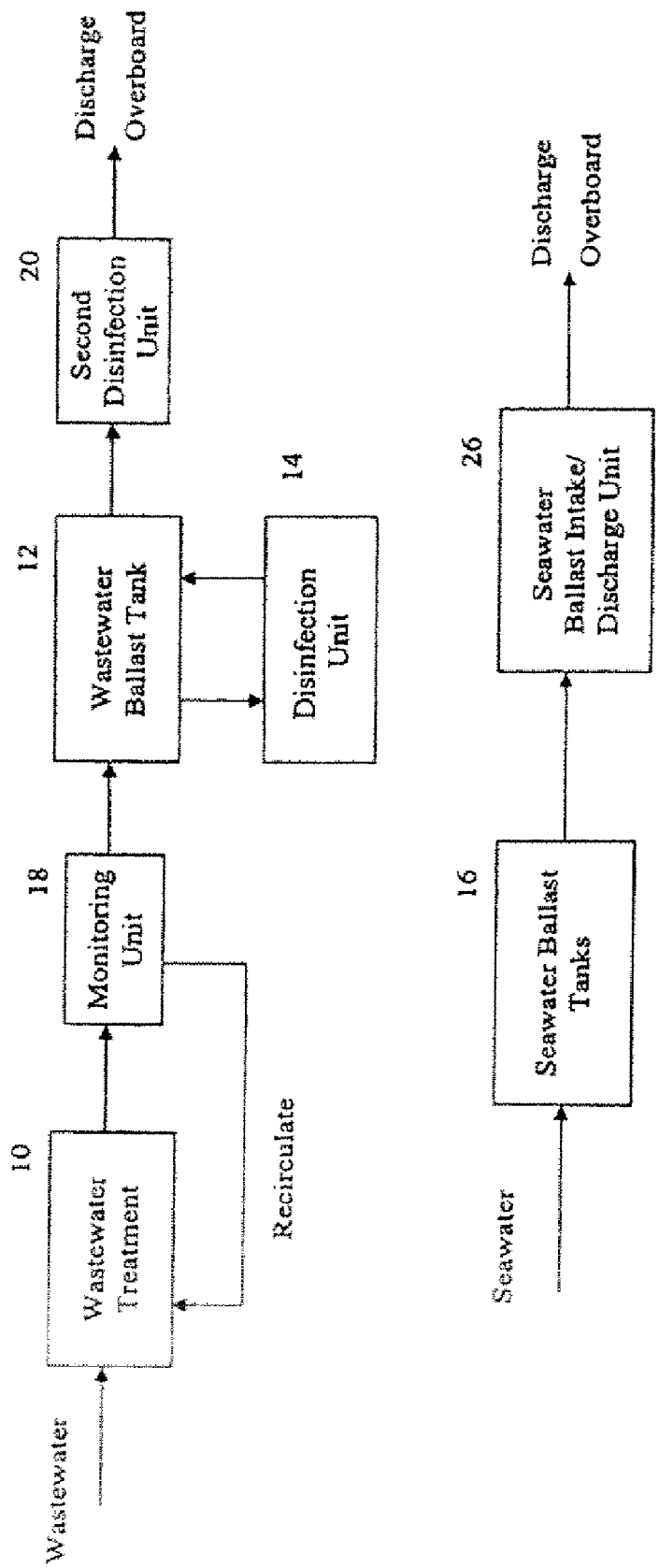
FIG. 2 illustrates a ballast system according to the invention.

According to another embodiment of the invention shown in FIG. 2, the wastewater ballast system may include a second disinfection unit 20. The second disinfection unit 20 may include an ultraviolet (UV) disinfection unit that decontaminates the treated wastewater by dosing it with ultraviolet light or similar electromagnetic radiation. It also may include devices that utilize other non-chemical disinfectants, e.g., ozone, hydroxyl ion injection, or the like. As shown in FIG. 2, the second disinfection unit 20 may be positioned downstream of the wastewater ballast tank 12, so that the treated wastewater that is stored in the wastewater ballast tank 12 may be disinfected before it is discharged from the vessel during vessel ballast operations.

In one embodiment of the invention, the second disinfection unit 20 includes a wastewater ballast discharge unit (not shown). The wastewater ballast discharge unit of the second disinfection unit 20 discharges treated wastewater during vessel ballast operations, e.g., during in-port de-ballast operations of a vessel. The wastewater ballast discharge unit of the second disinfection unit 20 also pumps treated wastewater from the wastewater ballast tank 12 ashore to a disposal facility (not shown) when the wastewater ballast has not been treated sufficiently to meet predetermined threshold requirements. The wastewater ballast discharge unit of the second disinfection unit 20 enables a vessel to perform contingency ballast operations, as discussed in more detail below.

Figure 6:
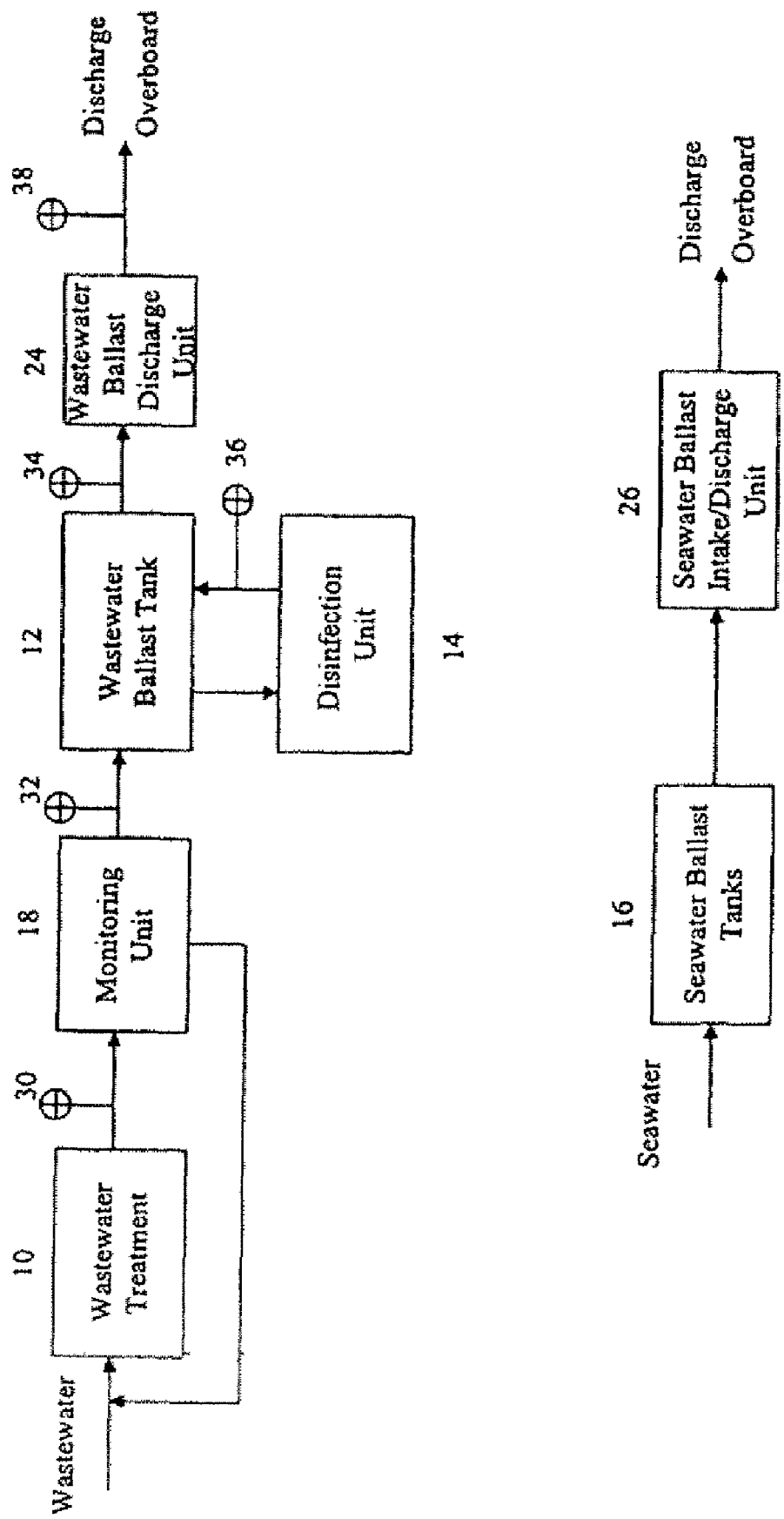
FIG. 6 discloses a wastewater treatment and sampling system according to the invention.

As shown in FIG. 6, the wastewater ballast system may include one or more sample ports that enable testing of samples of the treated wastewater. The sample ports enable samples to be taken of the wastewater during one or more stages of wastewater treatment, disinfection, storage, and discharge. Sample ports may also be for on-line control and analysis of wastewater. The samples may be tested for compliance with one or more federal, state, local or similar regulatory or environmental standards or requirements, e.g., fecal coliforms, zooplankton, phytoplankton, bacteria, pathogens, EPA priority pollutants, and conventional pollutants. Results of testing of the samples may be input to the control system 22, or used by the crew, or both, to control operation of the wastewater treatment unit 10, the disinfection unit 14, the monitoring unit 18, the wastewater ballast discharge unit 24, the second disinfection unit 20, and the seawater ballast discharge unit 26, so that a vessel may conduct ballast operations according to the invention.

The wastewater ballast system may include one or more sample ports that enable samples to be taken of the wastewater. A wastewater treatment unit sample port 30 may be positioned downstream of the wastewater treatment unit 10, so that samples may be taken of the wastewater after it has been treated in the wastewater treatment unit 10. In another embodiment of she invention, a wastewater treatment unit sample port (not shown) may be positioned at the wastewater treatment unit 10, so that samples may be taken of the wastewater during its processing and treatment in the wastewater treatment unit 10. The wastewater ballast system may include a monitoring unit sample port 32 that is positioned downstream of the monitoring unit 18, so that samples may be taken of the wastewater after it passes through the monitoring unit 18 to provide quality assurance for the treated wastewater that is stored in the wastewater ballast tank 12. In another embodiment of the invention, a monitoring unit sample port (not shown) may be positioned at the monitoring unit 18, so that samples may be taken of the wastewater as it passed through the monitoring unit 18. If the test results indicate that the treated wastewater does not meet threshold or regulatory requirements, the wastewater can be re-circulated through the wastewater treatment system 10 for further treatment, whereupon the retreated wastewater again may be sampled and tested for compliance with threshold or regulatory requirements.

A wastewater ballast tank sample port 34 may be positioned downstream of the wastewater ballast lank 12, so that samples may be taken of the wastewater before it is discharged from the vessel during ballast operations, in another embodiment of the invention, a wastewater ballast tank sample port (not shown) may be positioned at the wastewater ballast tank 12, so that samples may be taken of the wastewater that is stored within the wastewater ballast tank 12. If the test results of samples taken from the wastewater ballast tank sample port 34 detect the presence of residual bacteria and similar pathogens, the treated wastewater may be circulated through the disinfection unit 14 to kill the residual bacterial and pathogens.

A disinfection unit sample port 36 may be positioned on a return line between the disinfection unit 14 and the wastewater ballast tank 12, so that samples may be taken of wastewater after it has been, disinfected in the disinfection unit 14 and before the wastewater is returned to toe wastewater ballast tank 12. In another embodiment of the invention, a sample port (not shown) may be positioned at the disinfection unit 14, so that samples may be taken of the wastewater during its processing in the disinfection unit 14. If the test results indicate that the treated wastewater requires further disinfection to meet applicable regulatory standards, the control system 22 can re-circulate the wastewater from the wastewater ballast tank 12 through the disinfection unit 14. Alternatively, the control system 22 can circulate the wastewater from the wastewater ballast tank 12 through the second disinfection unit 20 to kill or remove fecal coliforms and other bacteria and pathogens from the treated wastewater.

A discharge line sample port 38 may be positioned downstream of the wastewater ballast discharge unit 24, so that the treated wastewater may be sampled before its discharge from a vessel. In another embodiment of the invention, a discharge line sample port (not shown) may be positioned at the wastewater ballast discharge unit 24, so that samples may be taken of the wastewater as it passes through the wastewater ballast discharge unit 24. If the test results of samples taken from the discharge line sample port 38 indicate that the treated wastewater does not meet applicable regulatory or threshold standards, contingency ballast operations may be implemented to discharge seawater ballast from the seawater ballast tanks 16 and to prevent the discharge of incompletely treated wastewater into local or regional waters. During contingency ballast operations, the wastewater ballast discharge unit 24 pumps the incompletely treated wastewater ashore to wastewater disposal facilities that are authorized to accept such effluent.

In another embodiment of the invention, the samples may be tested for compliance with applicable threshold and regulatory standards off-site from the vessel, e.g. during a vessel's seagoing operations. In this embodiment of the invention, the test results may be used to monitor the operation of the wastewater treatment system 10, the disinfection unit 14, or the second disinfection unit 20, and to monitor the condition of the wastewater during each of the treatment and storage processes. Depending upon the results of the testing, the wastewater ballast system may discharge the treated wastewater from the wastewater ballast tank 12 during the vessel's ballast operations, or the wastewater ballast system may utilize the contingency ballast system to discharge local or regional seawater ballast from the vessel's seawater ballast tanks 16.

In operation, the wastewater ballast system receives wastewater that is generated during vessel operations from galley operations, comfort facilities, maintenance, and similar vessel operations. As wastewater is generated, the wastewater is collected and treated by the wastewater treatment system (step 100). Wastewater treatment includes the filtering of the wastewater to remove sludge and particulate matter from the wastewater. Following treatment of the wastewater in the wastewater treatment system, the wastewater is discharged to the wastewater ballast tank 12, which stores the treated wastewater (step 110). In one embodiment of the invention, the treated wastewater may be recirculated through the disinfection unit 14 to ensure that the treated wastewater remains within the standards of treatment for which the wastewater treatment system provided and that any residual bacteria within the treated wastewater or within the wastewater treatment holding tank 12 does not propagate and contaminate the treated wastewater. The treated wastewater may be tested (step 120) to determine whether the treated wastewater meets predetermined requirements. The testing may be conducted at one or more of: (1) the wastewater treatment unit 10, e.g., at the wastewater treatment sample port 30; (2) the monitoring unit 18, e.g., at the monitoring unit sample port 32; (3) the wastewater ballast tank 12, e.g., at the wastewater ballast tank sample port 34; (4) the disinfection unit 16, e.g., the disinfection unit sample port 36; (5) the wastewater ballast discharge unit 24, e.g., the wastewater ballast discharge sample port 38. In one embodiment of the invention, the testing can as performed by an on-line testing system aboard the vessel. In another embodiment of the invention, the testing may be performed at facilities that are remote to the vessel and that communicate the results to the vessel.

Upon docking of the vessel in-port, the vessel begins in-port operations, which include in-take or loading of fuel, food, water, and other items. During loading of the fuel, food, and water, the vessel must de-ballast substance to compensate for the in-take of fuel, food, and water. If the tests of the treated wastewater indicate that the treated wastewater meets predetermined threshold values, the vessel discharges the treated waste from the wastewater ballast tank into regional wasters to de-ballast the vessel (step 130). If the tests of the treated wastewater indicate that the treated wastewater does not meet predetermined threshold values, the vessel does not discharge the treated wastewater from the wastewater ballast tanks 12 during in-port ballast operations (step 140) because the incompletely treated wastewater does not meet federal, state, or local standards for the discharge of such effluent. Instead, the vessel pumps the incompletely treated wastewater ashore for disposal at appropriate facilities that are capable of receiving such effluent.

Figure 4:
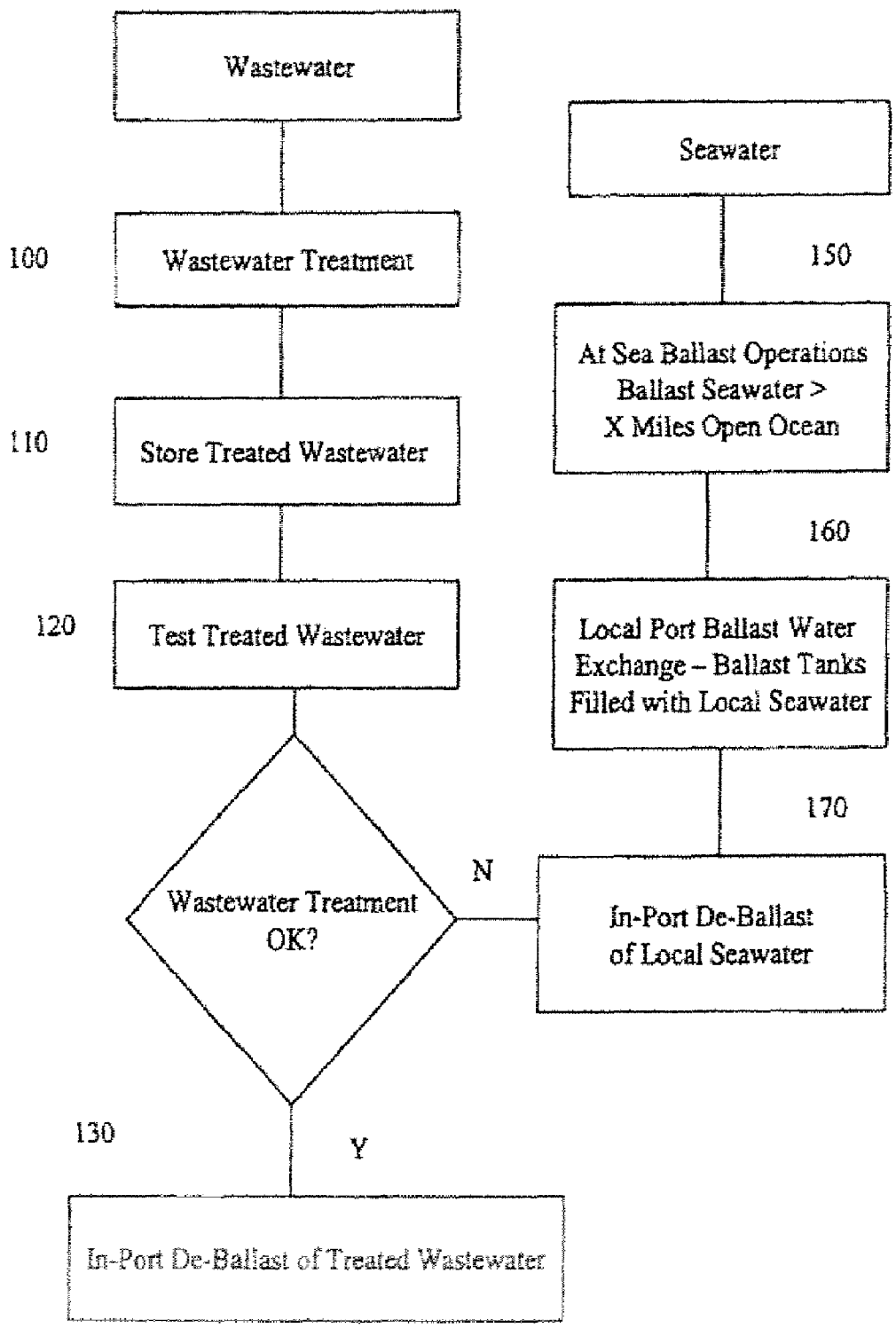
FIG. 4 discloses a contingency ballast method according to the invention.

As shown in FIG. 4, the present invention also includes a contingency ballast method for ballasting a vessel during in-port de-ballast operations. The contingency ballast system enables a vessel to perform in-port de-ballast operations with seawater ballast when the wastewater ballast system is unable to de-ballast the vessel during such in-port ballast operations. For example, this embodiment of the invention enables a vessel to perform in-port de-ballast operations when the wastewater ballast system does not treat or decontaminate wastewater to predetermined threshold standards. In such circumstances, the treated wastewater ballast cannot be discharged directly into local or regional wasters during in-port ballast operations.

In this embodiment, the vessel takes on ballast in the seawater ballast tanks 16 daring seagoing operations (step 150). For example, as the vessel consumes fuel, the vessel lakes on seawater ballast from non-local and non-regional waters (step 150). Upon entry or first call in local or regional waters, the vessel exchanges the seawater ballast in the vessel's seawater ballast tanks 16 (step 160). This procedures involves the discharge of the non-local or non-regional seawater ballast that was taken in and stored in the seawater ballast tanks 16 during seagoing operations and the intake of local or regional seawater as ballast in the seawater ballast tanks 16.

Figure 3:
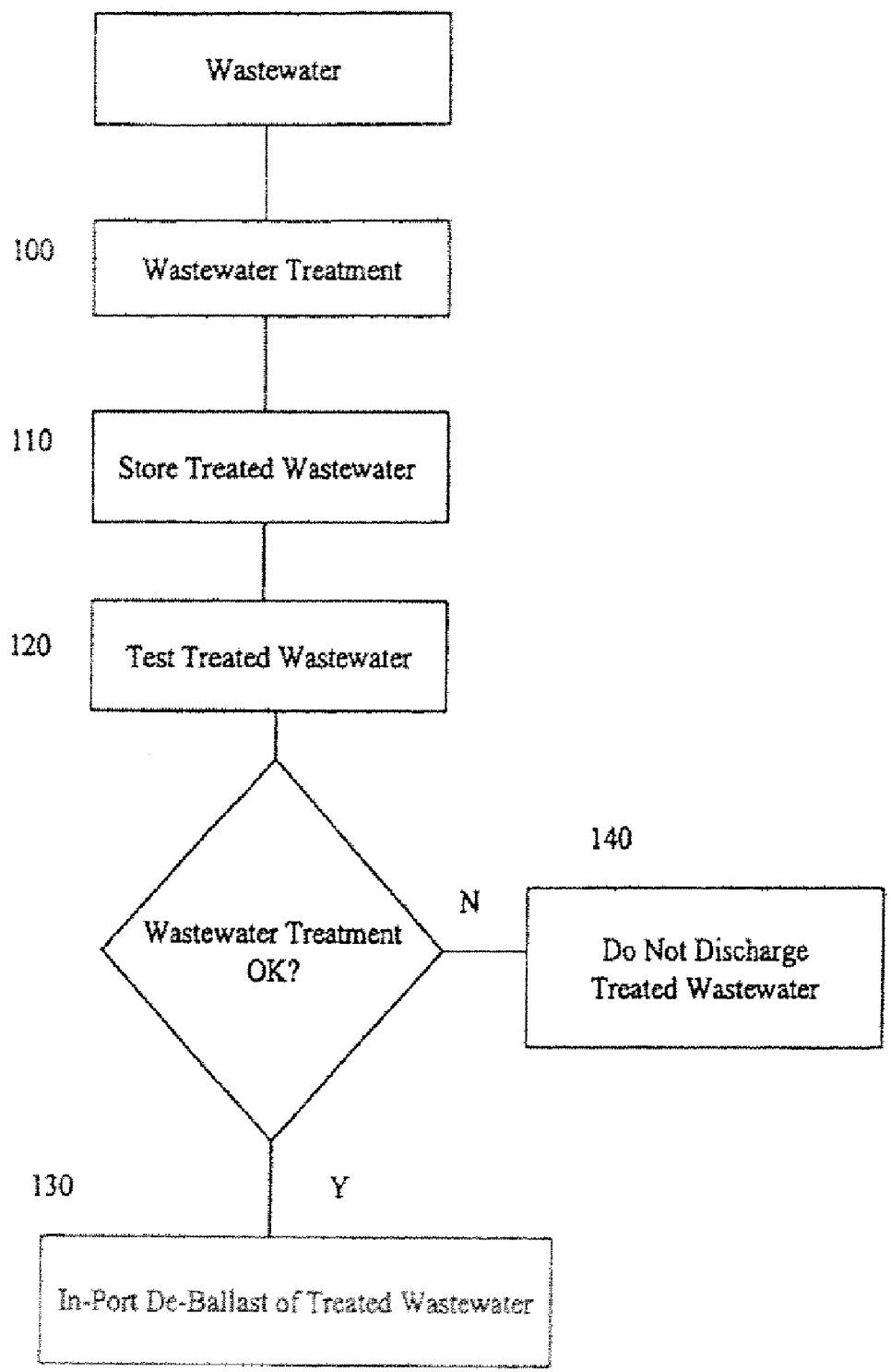
FIG. 3 discloses a ballast method according to the invention.

The wastewater ballast system treats wastewater (step 100) and stores the treated wastewater in wastewater ballast tanks 12 (step 110), as described in the previous embodiment with reference to FIG. 3. The wastewater ballast system also performs testing of the treated wastewater (step 120) to determine whether the treated wastewater meets predetermined threshold requirements. In one embodiment of the invention, the testing may be performed by an on-line system positioned aboard the vessel. In another embodiment of the invention, the testing is performed at a location remote from the vessel.

If the tests results indicate that the treated wastewater meets predetermined threshold values, the vessel may discharge the treated waste from the wastewater ballast tanks 12 into local or regional wasters to de-ballast the vessel during in-port operations (step 130). If the tests results indicate that the treated wastewater does not meet predetermined threshold standards for discharge directly into local or regional waters, the vessel utilizes the contingency ballast system and method. Instead of discharging treated wastewater ballast, the vessel discharges the local or regional seawater ballast from the seawater ballast tanks 16 during in-port ballast operations (step 170) because the incompletely treated wastewater does not meet federal, state, or local standards for the discharge of such effluent.

Operation of the wastewater treatment and ballast system may be fully automated and controlled by a control system 22. Control and monitoring will typically be done real time by the crew. A quality assurance (QA)/quality control (QC) program will be used to verify the day to day operation and readings of the control system 22 and the wastewater ballast system. If treated wastewater effluent does not meet predetermined thresholds or discharge standards, the real time control system, or the crew, will intervene. For example, if the treated wastewater does not meet predetermined thresholds or discharge standards, the effluent can be sent to holding tanks for discharge at sea, or recirculated for re-treatment by the treatment system.

Figure 5:
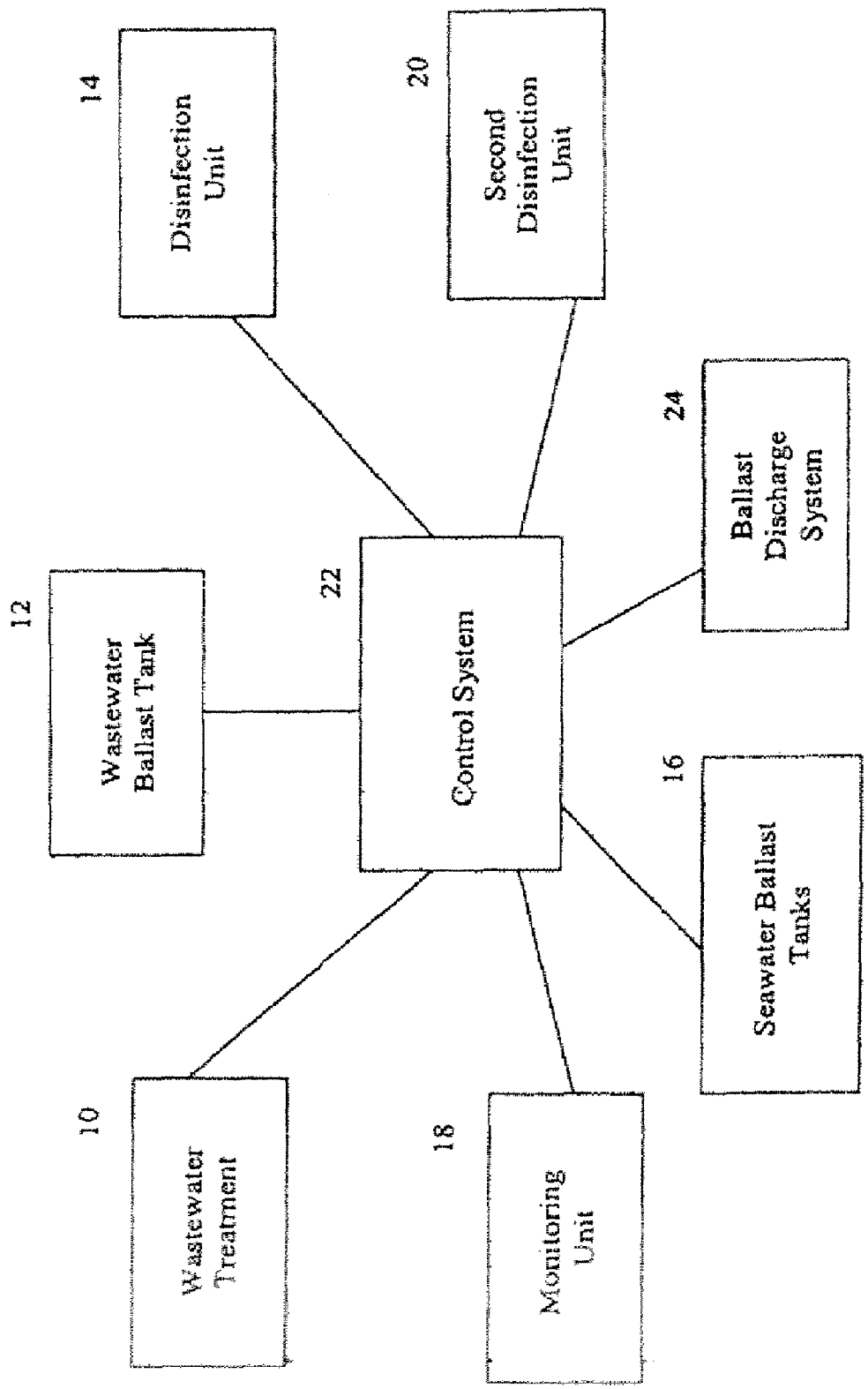
FIG. 5 discloses a control system according to she invention.

As shown in FIG. 5, the control system 22 controls operation of the wastewater treatment unit 10, the wastewater ballast tank 12, the disinfection unit 14, the seawater ballast tanks 16, the monitoring unit 18, the second disinfection unit 20, and the wastewater ballast discharge system 24, and the seawater ballast discharge system 26. The control system 22 monitors wastewater flow rates through the wastewater treatment unit 10. It monitors and controls operation of the wastewater treatment unit 12, e.g., dosage rates of an ultraviolet radiation unit, flow rates through filtering units (not shown). It monitors and controls storage of treated wastewater in the wastewater ballast tank 12. It also controls circulation of the treated, stored wastewater from the wastewater ballast tank 12 to a disinfection unit 14 for further treatment and disinfection of the treated, stored wastewater. The control system 22 controls operation of the monitoring unit 18 to measure parameters of the treated wastewater, e.g., turbidity, and to determine whether treated wastewater should be recirculated through the wastewater treatment unit 10. The control system 22 may perform its control routines, or it may be operated by the crew via input devices, e.g., instruments, and in response to alarms for which the crew may take appropriate actions to adjust operation of the wastewater ballast system.

The control system 22 also controls ballast operations of the vessel. For example, the control system 22 controls discharge of the treated wastewater from the wastewater ballast tanks 12 overboard of the vessel during ballast operations, e.g., during in-port ballast operations. The control system 22 also controls discharge of seawater ballast from the seawater ballast tanks 16 and seawater ballast exchange of local or regional seawater for non-local seawater in the seawater ballast tanks 16.

The control system 22 can monitor testing of the wastewater and process the test results of the sampled wastewater. The control system 22 may monitor and control on-line wastewater testing systems positioned aboard a vessel. The control system 22 can process test results of wastewater samples taken at one or more of wastewater treatment sample port 30, the monitoring unit sample port 32, the wastewater ballast tank sample port 34, the disinfection unit sample port 36, the wastewater discharge unit sample port 38, or the discharge line before the stored, treated wastewater is discharged from the vessel, in this manner, the control system 22 can control ballast operations by determining whether the treated wastewater meets federal, state, and local regulatory standards for discharge in local or regional waters during vessel in-port ballast operations. If the treated wastewater meets applicable regulatory standards, the control system 22 enables vessel ballast operations by discharging treated wastewater from the wastewater ballast tanks 12 to maintain stability of the vessel. If the wastewater does not meet applicable regulatory standards, the control system 22 stores the wastewater in a wastewater ballast tank 12 and performs contingency ballast operations by discharging local or regional seawater ballast from the seawater ballast tanks 16, as previously discussed. Thus, the present invention enables a vessel to perform in-port, contingency de-ballast operations when the wastewater treatment system is non-operational or unable to treat the wastewater to meet applicable regulatory standards.

In another embodiment of the invention, the wastewater ballast system and method may be used to ballast a vessel during seagoing operations. For example, upon entering freshwater from saltwater, a vessel may re-ballast to maintain proper stability. According to an embodiment of the invention, the vessel may discharge treated wastewater from the wastewater ballast tank to maintain the stability of the vessel without endangering the freshwater ecosystem.

Thus, the present invention provides numerous advantages over known ballast methods and systems, particularly for vessels that generate large volumes of wastewater that may be treated and stored as ballast, e.g., passenger vessels, military vessels. The present invention reduces or eliminates the environmental contamination of local or regional waters by eliminating the need to discharge non-local seawater ballast, which may be contaminated and dangerous to local ecosystems, during a vessel's in-port ballast operations. The elimination of the discharge of non-local seawater ballast reduces or prevents the introduction of harmful, non-indigenous, foreign marine species, organisms, and pathogens into local water. The present invention also reduces contamination of local waters by treating the wastewater before discharge during in-port ballast operations. Treatment of the wastewater ensures that the discharged wastewater ballast complies with pertinent federal, state, and local environmental, marine, and similar regulatory requirements.

The present invention also improves ballast operations and efficiency by reducing or eliminating the amount of seawater ballast that a vessel must intake during seagoing operations as food and water are consumed. As the wastewater is created, the present invention receives, treats, and stores the wastewater as ballast, so that the treated wastewater may be discharged by the vessel during in-port ballast operations or similar ballast operations of the vessel. If necessary, the present invention, re-treats the stored wastewater, e.g., by re-circulating the stored wastewater from a wastewater ballast tank through a disinfection unit, to prevent the propagation of residual bacterial and similar pathogens that may be present in the wastewater or wastewater ballast tanks. Treated wastewater that exceeds threshold values may be disposed of at sea or pumped ashore.

By treating wastewater so that it meets regulatory requirements for discharge in local waters, the present invention eliminates or reduces the cost and time required dispose of untreated wastewater during in-port operations. The use of advanced wastewater treatment systems also eliminates the discharge of chlorine and other chemicals that are harmful or toxic to marine life.

By its operation, the present invention reduces the in-port operation time and expense of vessels compared to known systems and methods. By enabling a vessel to discharge treated wastewater as ballast during in-port de-ballast operations, the present invention improves the efficiency of in-port vessel operations, thereby enhancing the profitability of commercial vessel operations. The present invention eliminates the need for vessels to store untreated wastewater and then pump the untreated wastewater ashore for further processing at waste disposal points or facilities. It also eliminates the need for vessels to travel out to sea to discharge untreated wastewater that does not meet standards. The discharge of treated wastewater ballast during in-port de-ballast operations reduces the time that a vessel spends in-port time and eliminates the need for vessels to voyage offshore when the vessels travel coastwise, thereby reducing travel time and the cost of operating the vessel. The present invention also eliminates the need for a vessel to travel out of port to exchange seawater ballast in its ballast tanks with local or regional water and then return to port to perform in-port de-ballast operations.

In addition, the present invention treats the wastewater prior to discharge, so that the discharged wastewater meets or exceeds/complies with pertinent federal, state, and local environmental and similar regulatory requirements. By relying on advanced wastewater treatment systems and methods, the present invention neutralizes and removes harmful fecal coliforms, harmful bacteria, and similar pathogens, as well as chemical, biological, and solid contaminants from the wastewater before discharging the wastewater during vessel ballast operations. The present invention recycles and treats the wastewater to near drinking-water quality, so that the treated wastewater may be discharged directly into local or regional wasters during in-port de-ballast operations. In so doing, the present invention enables vessels to conduct ocean-going operations, including in-port ballasting operations, in an efficient manner while complying with federal, state, and local laws and regulations.

The present invention also reduces the stress on, and degradation of, marine life and the environment created by known systems and methods that treat seawater ballast before discharge. Such known systems kill marine organisms that are present in the seawater to decontaminate the seawater prior to discharge of the seawater ballast in local waters. Thus, the present invention reduces or eliminates the use of chemical biocides, which are used to treat and decontaminate seawater ballast in known ballast systems and methods, so that the seawater may be discharged in local waters. The present invention also eliminates the need for the safe disposal of the non-indigenous, manse organisms that are filtered, or killed, or both, by known seawater ballast treatment systems.

The present invention further reduces the stress on vessels. For example, the treatment and storage of wastewater ballast reduces or eliminates the need to store seawater ballast aboard a vessel. The treated wastewater is less corrosive to ballast storage tanks than seawater ballast or untreated wastewater. Thus, the present invention reduces the time and expense required to maintain a vessel's ballast system, compared to known ballast systems and methods that use seawater to ballast a vessel. The present invention further reduces the need for coating, treatment, cathodic protection, and decontamination of wastewater ballast tanks, as is required in known systems that store seawater as ballast. In addition, the present invention treats wastewater and stores the treated wastewater in wastewater ballast tanks, thereby eliminating the need to store toxic wastewater effluent aboard a vessel.

By discharging treated wastewater ballast, the present invention improves known ballast and treatment systems because it receives and treats influent of relatively well-documented, consistent quality and characteristics, i.e., gray water, black water, wastewater, compared to known ballast systems that attempt to treat and decontaminate seawater ballast with its diverse, unknown, undocumented marine life.

Moreover, the wastewater ballast system and method of the present invention may be retrofitted on a vessel. Existing wastewater storage systems may be converted to wastewater treatment systems that treat wastewater to appropriate regulatory standards before storing the treated wastewater in wastewater ballast tanks that are capable of discharging the treated wastewater during ballast operations. Existing wastewater treatment systems may be upgraded to advanced treatment systems that decontaminate wastewater to near-drinking water quality and may be retrofitted to discharge the treated wastewater to a wastewater ballast tank from which the treated wastewater may be discharged during ballast operations. Existing seawater ballast systems may be converted to receive and store treated wastewater in converted ballast tanks that can discharge the treated wastewater during ballast operations. Thus, the present invention eliminates the need to install and operate a seawater ballast treatment system, thereby reducing capital costs and investments. It also enables vessels to operate throughout the world while complying with applicable regulatory requirements.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A wastewater ballast system comprising:
   a treatment unit for treating wastewater to meet predetermined standards;
   at least one wastewater ballast tank for storing said wastewater;
   a wastewater ballast discharge unit for discharging said wastewater from said at least one ballast tank; and
   a seawater ballast intake/discharge unit for receiving and discharging seawater ballast.

2. The system of claim 1, further comprising a monitoring unit for monitoring said wastewater to ensure that said wastewater meets said predetermined standards.

3. A wastewater ballast method comprising using the system of claim 2 in a vessel.

4. The system of claim 1, further comprising a filtering unit for filtering said wastewater.

5. A wastewater ballast method comprising using the system of claim 4 in a vessel.

6. The system of claim 1, further comprising a disinfection unit for disinfecting said wastewater.

7. A wastewater ballast method comprising using the system of claim 6 in a vessel.

8. The system of claim 1, further comprising at least one sample port for sampling said wastewater.

9. A wastewater ballast method comprising using the system of claim 8 in a vessel.

10. The system of claim 1, further comprising at least one seawater ballast tank for storing said seawater ballast during seagoing operations.

11. A wastewater ballast method comprising using the system of claim 10 in a vessel.

12. The system of claim 1, further comprising a control unit for controlling the operations of a least one of said treatment unit, said wastewater ballast tank, said discharge unit, a monitoring unit, a filtering unit, a disinfection unit, a seawater ballast tank, and/or a seawater intake/discharge unit.

13. A wastewater ballast method comprising using the system of claim 12 in a vessel.

14. A wastewater ballast method comprising using the system of claim 1 in a vessel.

15. A wastewater ballast method comprising the steps of:
    collecting wastewater generated during operation of a vessel;
    treating said wastewater to meet predetermined regulatory standards;
    storing said wastewater as ballast;
    discharging said wastewater from said vessel;
    receiving seawater ballast into said vessel; and
    discharging seawater ballast from said vessel.

16. The method of claim 15, further comprising monitoring said wastewater to ensure that said wastewater meets predetermined standards.

17. The method of claim 15, further comprising filtering said wastewater.

18. The method of claim 15, further comprising sampling said wastewater.

19. The method of claim 15, further comprising controlling the operation of at least one of a treatment unit, a wastewater ballast tank, a discharge unit, a monitoring unit, a filtering unit, a disinfection unit, a sample port, a seawater intake/discharge unit, and/or a seawater ballast tank.

* * * * *